United States Patent

Seigneur et al.

[19]

[11] Patent Number: 6,148,547
[45] Date of Patent: *Nov. 21, 2000

[54] CHAIN SAW GUIDE BAR FOR TREE HARVESTER

[75] Inventors: Christopher David Seigneur, West Linn; Duane M. Gibson, Milwaukie, both of Oreg.

[73] Assignee: Blount, Inc., Portland, Oreg.

[*] Notice: This patent is subject to a terminal disclaimer.

[21] Appl. No.: 09/420,132

[22] Filed: Oct. 18, 1999

Related U.S. Application Data

[63] Continuation-in-part of application No. 09/169,895, Oct. 12, 1998, Pat. No. 5,987,786.
[51] Int. Cl.[7] .............................. A01G 23/08; B23B 57/02
[52] U.S. Cl. .......................... 37/302; 144/4.1; 144/34.1; 30/387
[58] Field of Search ............................. 38/381, 386, 387; 144/4.1, 24.13, 34.1, 343; 414/739; 37/302

[56] References Cited

U.S. PATENT DOCUMENTS

| | | |
|---|---|---|
| 2,327,233 | 8/1943 | Wolf . |
| 2,838,833 | 6/1958 | Richardson . |
| 2,839,096 | 6/1958 | Cutrone . |
| 2,845,967 | 8/1958 | Hutchinson . |
| 2,888,964 | 6/1959 | Mall . |
| 2,897,856 | 8/1959 | Carlton . |
| 4,315,370 | 2/1982 | Horne . |
| 5,093,998 | 3/1992 | Siegneur . |
| 5,709,254 | 1/1998 | Argue . |
| 5,987,786 | 11/1999 | Gibson et al. .............................. 37/302 |

*Primary Examiner*—Robert E. Pezzuto
*Attorney, Agent, or Firm*—Robert L. Harrington

[57] ABSTRACT

A chain saw guide bar for a tree harvester is arranged to yield when an excessive force is applied such as when the guide bar becomes jammed in a cut. Yielding of the guide bar protects the bar holder from damage. The guide bar is heat treated or otherwise structurally modified to provide the desired yield strength.

10 Claims, 4 Drawing Sheets

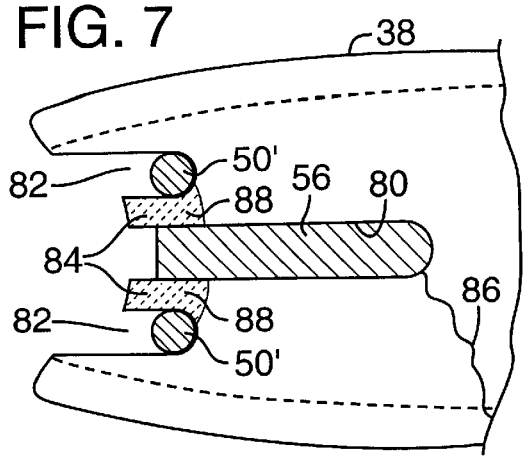
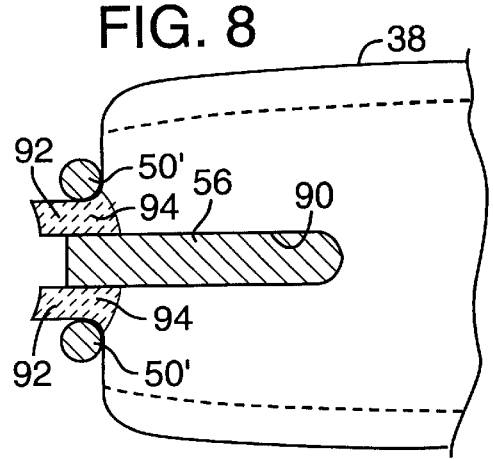
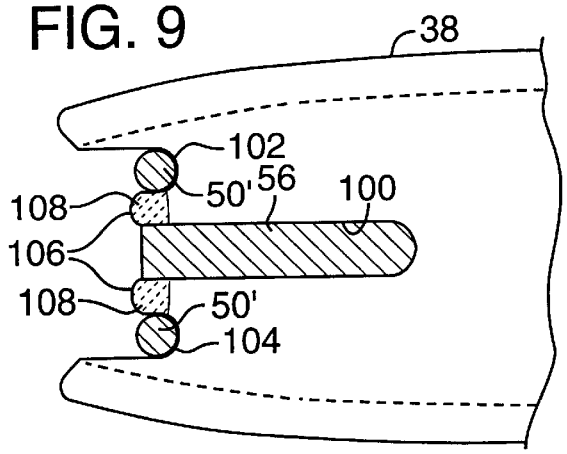
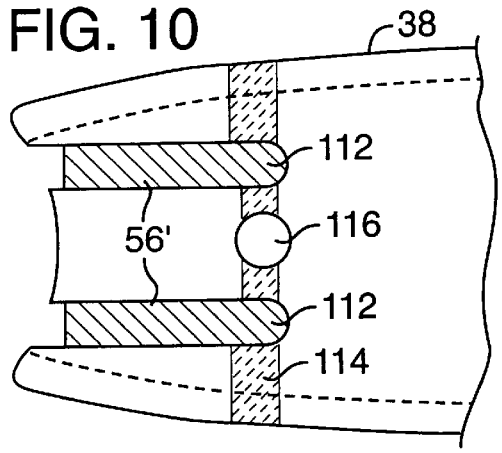
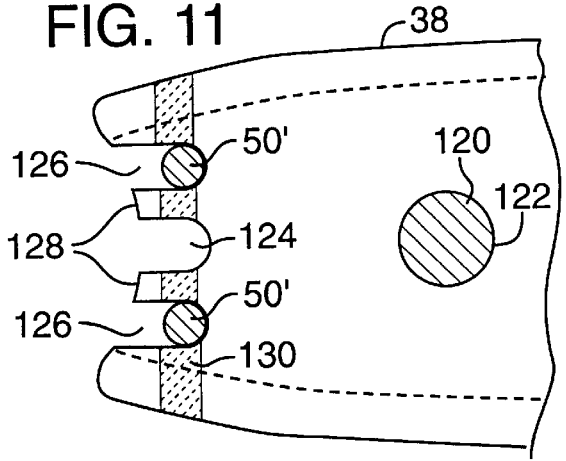
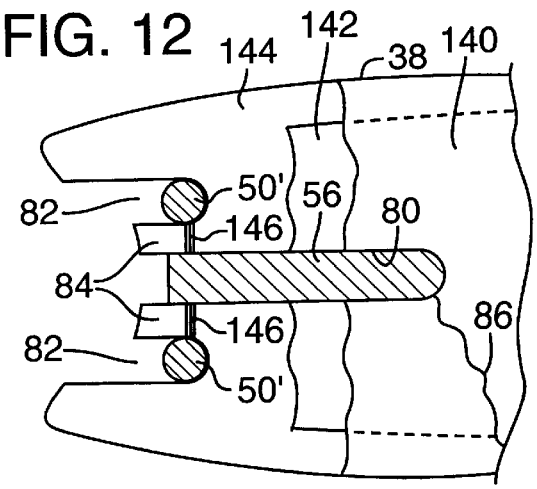

CHAIN SAW GUIDE BAR FOR TREE HARVESTER

This is a continuation-in-part of U.S. Ser. No. 09/169,895 filed Oct. 12, 1998, now U.S. Pat. No. 5,987,786, the disclosure of which is incorporated herein by reference.

FIELD OF THE INVENTION

This invention relates to guide bars and related apparatus for chain saws mounted on tree harvesters and more particularly to guide bar features for control of repair costs to the apparatus as a result of tree harvester accidents.

BACKGROUND OF THE INVENTION

The above recited pending application is directed to a tree harvester chain saw having a guide bar configured to slidably mount onto a bar holder of the saw. The invention induces proper mounting (use of supporting pins) which renders the bar less likely to break in an accident and provides for quick removal and replacement in the event a bar breaks. With the chain removed, the bar readily slides free of the bar holder and a new bar slides into its place.

The present invention is directed to alternate configurations for such a guide bar and to a further modification and improvement to the guide bar of that invention.

As concerns tree harvesters, the forces that are available to a tree harvester operator are great and can readily break guide bars and bar holders when applied under the right conditions. Ideally when operating a tree harvester, the maximum force applied to the bar and bar holder while cutting is about 100 lbs. and both bar and bar holder will withstand such forces for a long period of use. However, it is quite typical that the ideal conditions are interrupted by what is here referred to as accidents. An accident occurs, for example, when an upper portion of the tree being cut slips in the tree harvester grapple and the chain and guide bar are pinched between the upper and lower portions of the tree. The operator has limited means by which to free the chain and bar and often he simply applies the greater power of the tree harvester to pull the bar free of the tree. That force can readily break the chain and bar and will often be done intentionally so as to allow repairs and continuation of the tree harvesting operation. The operator carries extra chain loops and extra guide bars as they are most subject to wearing and require periodic replacement in any event. Thus if the chain and/or guide bar breaks, the operator can effect repair and return of the harvester to operative condition without undue delay.

Whereas the preferred situation is that no accidents occur and thus no interruptions for repair, it is far more preferred that when a damage causing accident does happen, the guide bar will break rather than the bar holder. The bar holder is expected to last for years (as compared to the wear rate of a bar, e.g., one to three weeks) and the cost of a replacement bar holder is perhaps ten times that of a bar. Replacement of the bar holder is more complex and time consuming and most often an extra bar holder is not readily available. Thus the out of service cost for breaking a bar holder is far greater than is the breaking of the bar.

As indicated, ideally there are no accidents. However, accidents (of the type described above) do happen. In the event of an accident, it is preferred that nothing breaks. The bars can be made sufficiently strong to resist breaking in many types of accidents but an occasional accident will exceed the strongest bar and either the bar or the bar holder will break.

It is accordingly a further objective of the present invention to provide a bar that resists breaking but will break before the applied force is so great as to break the bar holder.

BRIEF DESCRIPTION OF THE INVENTION

It has been explained for the prior invention that a bar mounted on a tree harvester with an elongated boss of the bar holder positioned in a center slot of the bar generates a splitting force at the tail end of the bar. The tail of the bar can accordingly split at the center slot when the forces typical for normal cutting action are sufficiently exceeded. The occurrence of such splitting has been largely resolved by drilling a hole in the tail of the bar on the side of the slot that is urged to pivot away from the boss. A bolt is inserted through the hole and into the bar holder. The resistance to bar breakage is greatly increased by this modification but in many cases too much so. It then can occur that the bar holder will break before the bar.

The preferred embodiment of the '895 application replaces the hole in the bar with a second or off center slot that extends to the tail end of the bar. This further modification allows the bar to be slid on and off the bar holder and avoids having to insert and remove the bolt. A permanent pin or bolt nested in the off center slot of the bar provides increased strength and resists splitting but not necessarily to the same extent as the bolt and hole arrangement.

In the present invention, the bar configuration is specifically designed to protect against the breakage of the bar holder. In the preferred embodiment, the configuration of the '895 application is used. The off center slot projected along side the boss receiving center slot produces an intermediate web or finger of bar steel between the two slots. If that finger of steel breaks off, the bar will immediately break. There are a number of factors that can affect the strength of the steel finger. The length of the finger (or slot), the width and thickness of the finger and the hardness of the steel all impact on the strength of the finger and the force required to break off the finger. In the preferred embodiment, the finger length and width is primarily dictated by the bar design. A narrow tail end of the bar may be dictated by the drive sprocket and the pin diameter and its location in the bar holder does not allow for much modification of the width and length of the finger. Thus, the bar configuration is primarily designed to fit the bar holder. To the extent further strengthening or weakening of the finger is desirable, the finger can be heat treated to increase or decrease the steel hardness to achieve the desired point of breakage.

A determination is made as to the force required to break a bar holder in a new condition. Some leeway is provided to account for wearing and fatiguing of a bar holder over a period of use, e.g., three years. Thus in a new condition, the bar will be designed to break at, e.g., 60–90% of the force required to break the bar holder. Assuming a 70% force to be the desired point of bar breakage, the bar finger is weakened or strengthened, e.g., heat treated to establish a breaking point at 70% of the known point of breakage of a bar holder in a new condition. In an example where a known bar holder was broken by a 4,000 lb. force applied to a bar at a point 17 inches from where it mounts to the bar holder, the bar finger of the bar designed to fit the holder was heat treated to generate a point of breakage under the same conditions at a force of 2,800 lbs.

The invention will be more fully appreciated upon reference to the following detailed description and drawings referred to therein.

BRIEF DESCRIPTION OF THE DRAWINGS

FIGS. 7–12 are views illustrating various embodiments of the invention.

DESCRIPTION OF THE PREFERRED EMBODIMENT

Figure 1:
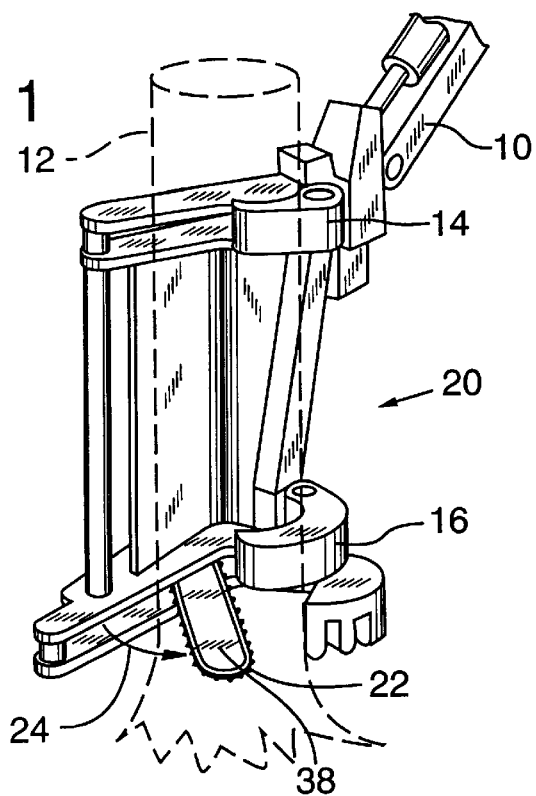
FIG. 1 is a view of a portion of a tree harvester.
Figure 2:
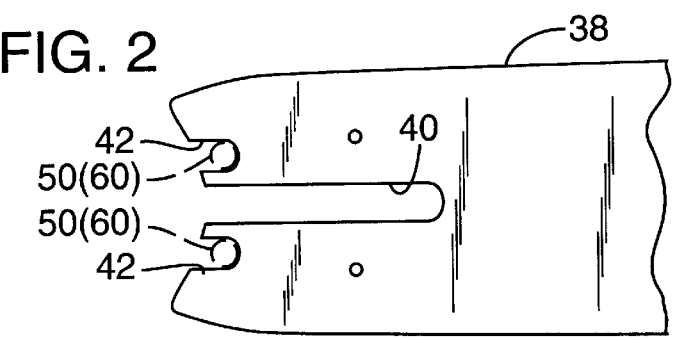
FIG. 2 is a side view of a tail end section of a guide bar embodying the present invention.

FIG. 1 illustrates a boom portion 10 of a tree harvester. The boom portion 10 is mounted to a mobile vehicle (not shown). A harvester head 20 mounted to the boom includes a chain saw power head that rotatably drives a drive sprocket which propels the saw chain 22 around a guide bar 38. Basically the harvester head 20 is movable to be positioned against a tree 12 that is to be felled and has clamping mechanisms 14, 16 that will clamp the harvester head 20 to the tree 12. The guide bar 38 around which the saw chain 22 is entrained is then pivoted as indicated by arrow 24 to cut through the trunk of the tree 12. A significant force is imparted to pivot the guide bar 38 during this operation and therefore the guide bar 38 must be suitably mounted to the harvester head. Such mounting is typically accomplished by first mounting the bar in a bar holder which in turn is mounted to the harvester head. FIGS. 3–6 illustrate the mounting of the guide bar 38 to the bar holder 48.

Figure 3:
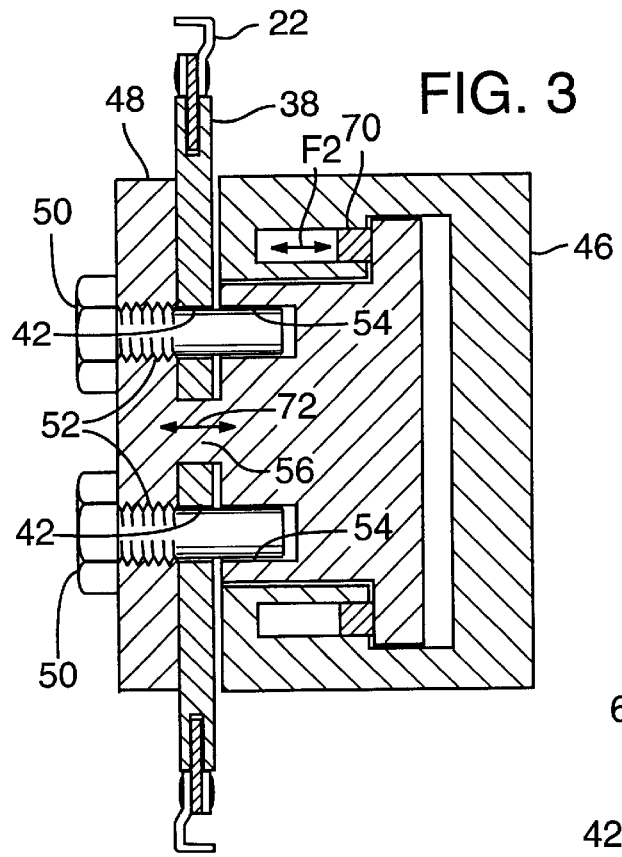
FIG. 3 is a cross section view of the mounting structure mounting the guide bar to the tree harvester of FIG. 1 as if taken on view lines 4—4 of FIG. 6.
Figure 4:
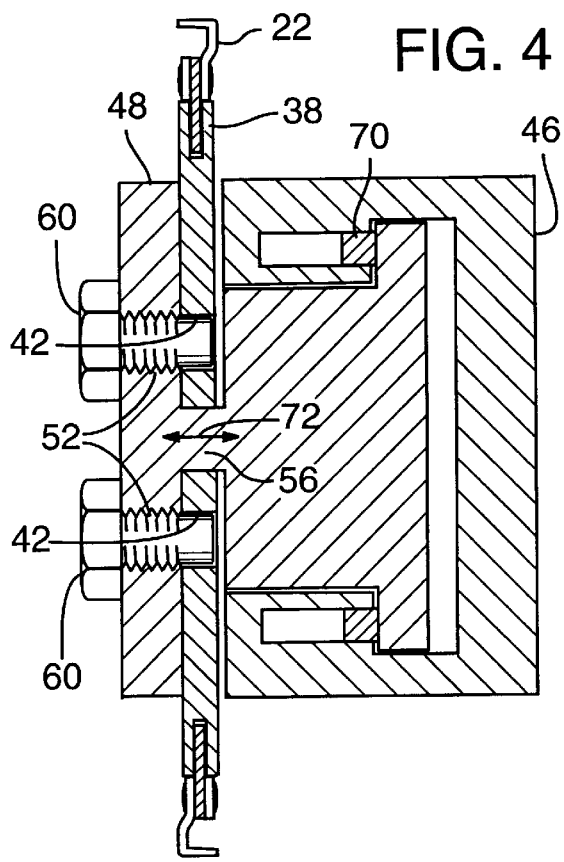
FIG. 4 is a view similar to FIG. 3 showing another mounting arrangement.
Figure 5:
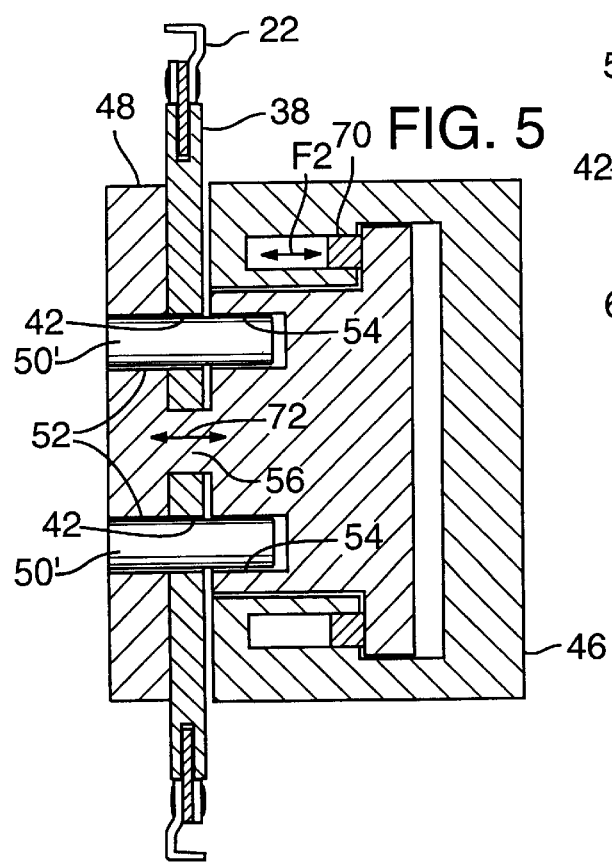
FIG. 5 illustrates a modification to the mounting structure of FIG. 3 permitted by the bar of FIG. 2.
Figure 6:
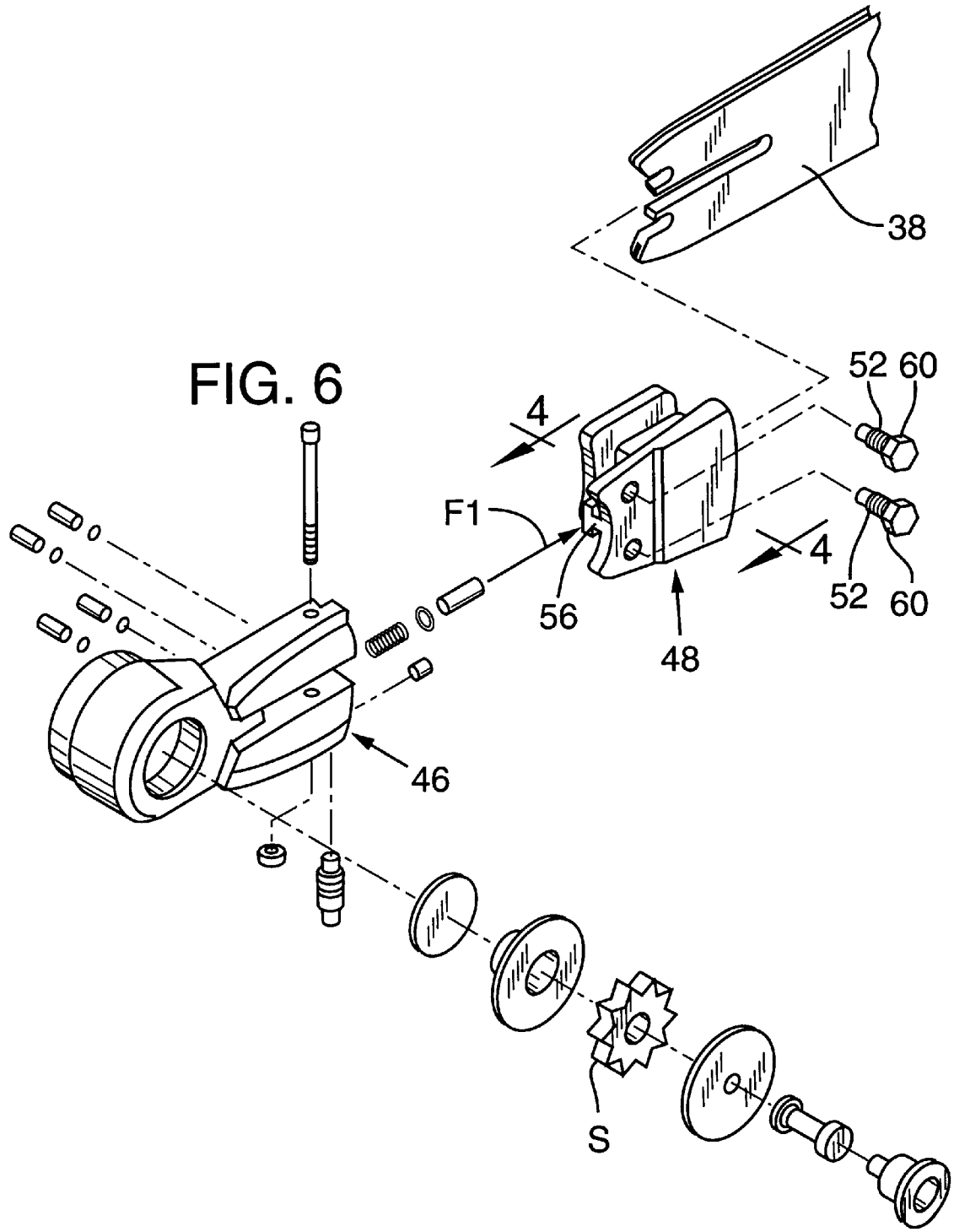
FIG. 6 is a perspective view illustrating the mounting structure with its various components in exploded relation.

With reference to FIGS. 3–6, it will be appreciated that the cross sectional views of FIGS. 3–5 are taken as if the components of FIG. 6 were in the assembled condition. Referring specifically to FIG. 3, guide bar 38 is slid onto the bar holder 48, the slots, e.g., slots 80 and 82 of FIG. 7 being seated onto the boss 56 and pins 50. The chain 22 is then mounted to the bar and drive gear. With the bar and chain in place, the bar 38 and bar holder 48 are slid forward (force F1 in FIG. 6) to tighten the chain. Pistons 70 are then actuated to force sliding movement (force F2) of bar holder 48 relative to housing 46 to pinch the bar 38 between the bar holder 48 and housing 46 and thereby lock up the entire assembly.

FIGS. 4 and 5 vary only in the structure of the pins 50, i.e., as replaced by pins 60 and 50' in FIGS. 4 and 5, respectively. They otherwise function in the same manner as described above.

FIGS. 7–11 illustrate by example various configurations of the guide bar 38 arranged to yield under a heavy load yet maintain adequate structural integrity during normal operation of the tree harvester. FIG. 7 illustrates one variation of the guide bar 38. The guide bar 38 has an open ended center slot 80 sized to receive a shoulder portion (boss) 56 of the bar holder 48. The guide bar 38 has formed open-ended slots 82 adjacent the center slot 80 with the center slot 80 and the adjacent slots 82 forming extending fingers 84. The slots 82 will receive the mounting studs or pins such as the pins 50' illustrated in FIG. 5. The mounting arrangement as previously described in the '895 patent assures that the bar 38 is securely supported in the bar holder. In this example, the fingers 84 are heat treated in zone 88 to a degree such that when an excessive force is applied to the bar 38, e.g., in an accident, one of the fingers 84 will yield or break off from the bar 38. For example, if the forces are such that boss 56 in FIG. 7 is urged to pivot counter clockwise relative to the bar 38, the upper pin 50' acts against upper finger 84 to prevent spreading of slot 80. When the force is sufficient to cause that finger to break off, the boss 56 will twist in the slot to spread the tail end and cause breakage such as indicated by crack 86.

FIG. 8 illustrates another variation of the bar 38 that is suited for mounting in the bar holder of the harvester head 20. In this example, the bar 38 has a center slot 90 that will receive the boss 56 of the bar holder. Fingers 92 are formed adjacent the center slot 90 and are arranged to engage the pins 50' of the bar holder. The fingers 92 are heat treated with the heat treated zone 94 being designated by the shaded areas. The fingers 92 function in the same manner as fingers 84 but avoid the slot configuration as illustrated.

FIG. 9 illustrates another guide bar 38 having a center open-ended slot 100 arranged to receive the boss 56 of the bar holder. The center slot 100 in combination with recesses 102 and 104 define extending fingers 106. The recesses 102 and 104 will receive the pin 50' when installed in the bar holder. The fingers 106 are heat treated, with the zone of the heat treat being designated by the shaded areas 108. The fingers 106 have a reduced strength and will yield by bending or breaking off when an excessive force is applied to the bar 38. The fingers still have adequate strength to sustain the forces applied to the bar under normal operating conditions.

Figure 9A:
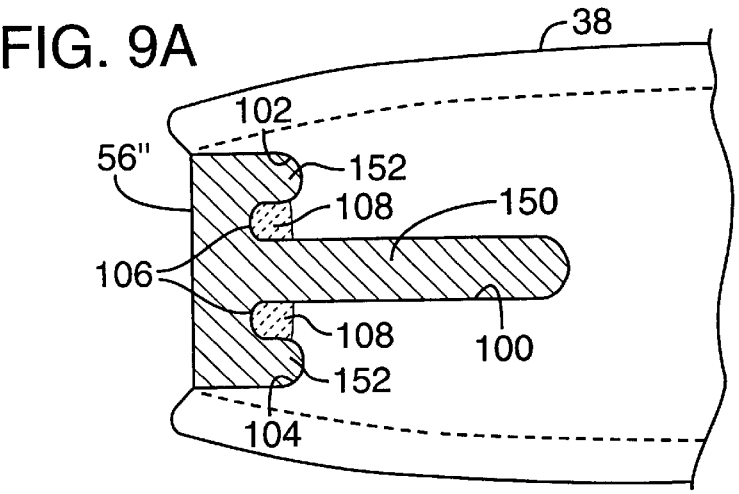

FIG. 9A illustrates the guide bar 38 of FIG. 9 supported by a configured boss 56" of the bar holder. In this embodiment the boss 56" has a center projection 150 that fits in the center slot 100. The boss 56" has extending lobes 152 that fit in the recesses 102, 104 of the bar 38. This arrangement eliminates the use of the pins 50'. The fingers 106 are heat treated with the heat treated zone being designated by 108. When an excessive force is applied to the bar 38, the fingers are arranged to yield and the bar will break away substantially as shown in FIG. 7.

FIG. 10 illustrates another bar 38 that is arranged to be mounted in a bar holder having two mounting bosses 56'. Slots 112 are provided in the bar 38 to receive the bosses 56'. The bar 38 in this example is heat treated in the shaded zone designated as 114. A hole 116 is provided in the zone 114, the hole being positioned at about the center point between the outer edges of the zone 114. The heat treated zone 114 in combination with the hole 116 reduces the strength of the bar in the zone 114. The bar 38 has adequate structural strength for normal operations but will fail in the heat treated zone when an excess force is applied against the bar 38.

FIG. 11 illustrates another example of a bar 38 that is arranged to be mounted in a bar holder. In this example, the bar holder would have a retention pin 120 that would be inserted into a bore 122 provided in the bar 38. The bar 38 has a center open-ended slot 124. Two additional open-ended slots 126 are provided, one on each side of the center end slot 124. The slots 124 and 126 define extending fingers 128. The slots 126 are arranged to receive pins 50' of the bar holder. In this example the bar has a heat treated zone that extends across the width of the bar 38, including the fingers 128. The heat treated zone is in the shaded area and is designated by 130.

In the examples of FIGS. 7–11, the guide bar is heat treated in specific zones to provide a guide bar with the desired yield strength. The guide bar fingers may be modified structurally in other ways to obtain the desired strength. FIG. 12 illustrates one example of modifying the guide bar 38 in a manner other than heat treating. FIG. 12 shows the bar 38 having outer laminates 140, 144 and a center laminate 142. FIG. 12 is similar to FIG. 7 in structure. However, instead of having a heat treated zone, the outer laminates 140, 144 have a groove 146 that is formed and extends across the defined fingers 84. The grooves 146 decreases the strength of the fingers 84 to thus protect the bar holder when an excessive force is applied to the guide bar 38. When an excessive force is applied to the bar 38, a finger 84 will fail and the bar will break away as previously described in reference to FIG. 7. It will be appreciated that the guide bar fingers may be modified in other ways to provide the desired strength.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A combination guide bar and bar holder for mounting the guide bar to a chain saw of a tree harvester comprising:

a bar holder for mounting to a tree harvester;

a saw chain guide bar having a nose end and a tail end;

said bar holder including a pair of mounting bosses and said tail end having a configured end portion fitted between said bosses with the bar mounted to said bar holder, said bosses cooperatively providing a non-pivotal relationship between said bar holder and bar;

said bar holder and said guide bar subjected to a varying pivotal force during operation of the tree harvester that cooperatively stresses the boss and the tail end of the bar, said boss being breakable at a determined pivotal force and said tail end designed to break at a pivotal force less than the determined pivotal force.

2. A combination guide bar and bar holder as defined in claim 1 wherein the tail end has a slot and one of the bosses is elongated and fitted to the slot and as fitted in the slot prevents pivoting of the bar relative to the boss, said tail end having a finger of bar material defining one side of the slot and a pin providing said other boss and seated against said finger and secured to the bar holder to prevent the finger from pivoting away from the boss when subjected to a pivotal force, said finger designed to break away from the bar upon application of a pivotal force less than the determined pivotal force.

3. A combination guide bar and bar holder as defined in claim 2 wherein said slot is a center slot and including an off center slot in the guide bar, said slots defining a strip of material that extends between the slots to provide said finger, and said pin seated in the off center slot.

4. A combination guide bar and bar holder as defined in claim 2 wherein the finger is heat treated to produce the designed breakage of the finger.

5. A combination guide bar and bar holder as defined in claim 1 wherein the tail end has a plurality of slots which define outer side fingers, said pair of bosses seated in the slots to cooperatively prevent pivoting of the bar relative to the bar holder and thereby apply a force against said fingers, said fingers provided to break away from the bar when subjected to a pivoting force less than said determined pivotal force.

6. A combination guide bar and bar holder as defined in claim 5 wherein said bosses are pins and including a center hole in the guide bar and a center pin on the bar holder projected through the center hole.

7. A combination guide bar and bar holder as defined in claim 5 wherein said bosses are elongated to fit lengthway in the slots and prevent pivoting of the bosses relative to the guide bar.

8. A combination guide bar and bar holder as defined in claim 1 wherein the tail end of the bar is configured to provide a plurality of slots defining at least one finger of bar material, and said pair of bosses provided by an integral configured portion of said bar holder fitted to the plurality of slots and subjecting the finger to a pivoting stress when pivoting the bar, said finger configured to break away from the bar at a pivotal force less than said determined pivotal force.

9. A combination guide bar and bar holder for mounting the guide bar to a chain saw of a tree harvester comprising:

said bar holder including a pair of bosses, said guide bar having a configured tail end including a slot defining finger portions on each side of the slot, said configured tail end slidably fitting onto the pair of bosses with a boss on each side of one of said finger portions and as fitted resisting pivoting as between the bar holder and guide bar.

10. A combination guide bar and bar holder as defined in claim 9 wherein at least one of said bosses is an elongated boss that fits the slot and as fitted in the slot resists pivoting of the guide bar relative to the guide bar holder, and said other boss cooperatively resisting said pivoting.

* * * * *